US012670266B2

(12) United States Patent
Wei et al.

(10) Patent No.: US 12,670,266 B2
(45) Date of Patent: Jun. 30, 2026

(54) SECURE MULTI-PARTY COMPUTATION

(71) Applicant: Alipay (Hangzhou) Information Technology Co., Ltd., Hangzhou (CN)

(72) Inventors: Tao Wei, Hangzhou (CN); Yulong Zhang, Hangzhou (CN); Ran Duan, Hangzhou (CN); Zhenfei Zhang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 233 days.

(21) Appl. No.: 18/552,152

(22) PCT Filed: Feb. 18, 2022

(86) PCT No.: PCT/CN2022/076771
§ 371 (c)(1),
(2) Date: Sep. 22, 2023

(87) PCT Pub. No.: WO2022/199290
PCT Pub. Date: Sep. 29, 2022

(65) Prior Publication Data
US 2024/0176899 A1    May 30, 2024

(30) Foreign Application Priority Data

Mar. 25, 2021    (CN) .......................... 202110317808.2

(51) Int. Cl.
*G06F 21/60*        (2013.01)
*H04L 9/32*         (2006.01)
(52) U.S. Cl.
CPC .......... *G06F 21/602* (2013.01); *H04L 9/3263* (2013.01); *H04L 2209/46* (2013.01)
(58) Field of Classification Search
CPC .... G06F 21/602; G06F 21/53; G06F 21/6218; H04L 9/3263; H04L 2209/46
See application file for complete search history.

(56) References Cited

U.S. PATENT DOCUMENTS 10,601,589 B1 *    3/2020    Prokopenya .......... H04L 9/3247
2012/0185946 A1    7/2012    Kamara et al.
(Continued)

FOREIGN PATENT DOCUMENTS

CN        110034924 A    7/2019
CN        111049825 A    4/2020
(Continued)

OTHER PUBLICATIONS

Payman Mohassel, Mike Rosulek, and Ye Zhang. 2015. Fast and Secure Three-party Computation: The Garbled Circuit Approach. In Proceedings of the 22nd ACM SIGSAC Conference on Computer and Communications Security (CCS '15). doi.org/10.1145/2810103. 2813705 (Year: 2015).*
(Continued)

*Primary Examiner* — Catherine Thiaw
*Assistant Examiner* — Amir Mahdi Hajiabbasi
(74) *Attorney, Agent, or Firm* — Womble Bond Dickinson (US) LLP

(57)        ABSTRACT

Some embodiments of this specification provide a secure multi-party computation method and apparatus. According to the method in these embodiments, first, a TEE node cluster including K TEE nodes is joined based on a quantity N of data owners; then, a trusted execution environment is created in the TEE nodes, and a basic algorithm for secure K-party computation is loaded into the trusted execution environment; next, at least one data fragment is obtained from the trusted execution environment; and finally, secure K-party computation is performed by using the basic algorithm for secure K-party computation and the obtained data fragment.

6 Claims, 2 Drawing Sheets

(56)                References Cited

U.S. PATENT DOCUMENTS

| | | | |
|---|---|---|---|
| 2015/0371059 A1* | 12/2015 | Bilogrevic | H04L 9/085 |
| | | | 726/26 |
| 2016/0224799 A1* | 8/2016 | Uzun | G06F 21/6227 |
| 2019/0130119 A1* | 5/2019 | Lin | H04L 9/0894 |
| 2019/0149333 A1 | 5/2019 | Harnik | |
| 2019/0205568 A1* | 7/2019 | Veugen | H04L 9/008 |
| 2019/0222414 A1 | 7/2019 | Pe'Er et al. | |
| 2020/0226284 A1* | 7/2020 | Yin | G06F 21/6254 |
| 2020/0259651 A1* | 8/2020 | Mohassel | H04L 9/3218 |
| 2020/0356670 A1* | 11/2020 | Cheng | G06F 21/71 |
| 2020/0389304 A1* | 12/2020 | Gryb | H04L 9/085 |
| 2021/0224797 A1 | 7/2021 | Berengoltz et al. | |

FOREIGN PATENT DOCUMENTS

| | | |
|---|---|---|
| CN | 112182642 A | 1/2021 |
| CN | 112307488 A | 2/2021 |
| CN | 112380578 A * | 2/2021 ......... G06F 21/6227 |
| CN | 112926051 A | 6/2021 |
| EP | 2663948 B1 | 4/2016 |
| WO | WO-2021010896 A1 * | 1/2021 .............. G06N 3/08 |

OTHER PUBLICATIONS

The International Search Report and Written Opinion for International Application No. PCT/CN2022/076771 mailed on Apr. 28, 2021.

"European Search Report" regarding EP Application No. 22773952. 1, mailed on Aug. 23, 2024. pp. 1-7.

"IP Office of Singapore: Search Report and Written Opinion" regarding patent application No. 11202307259R, mailed on Dec. 4, 2025. pp. 1-9.

* cited by examiner

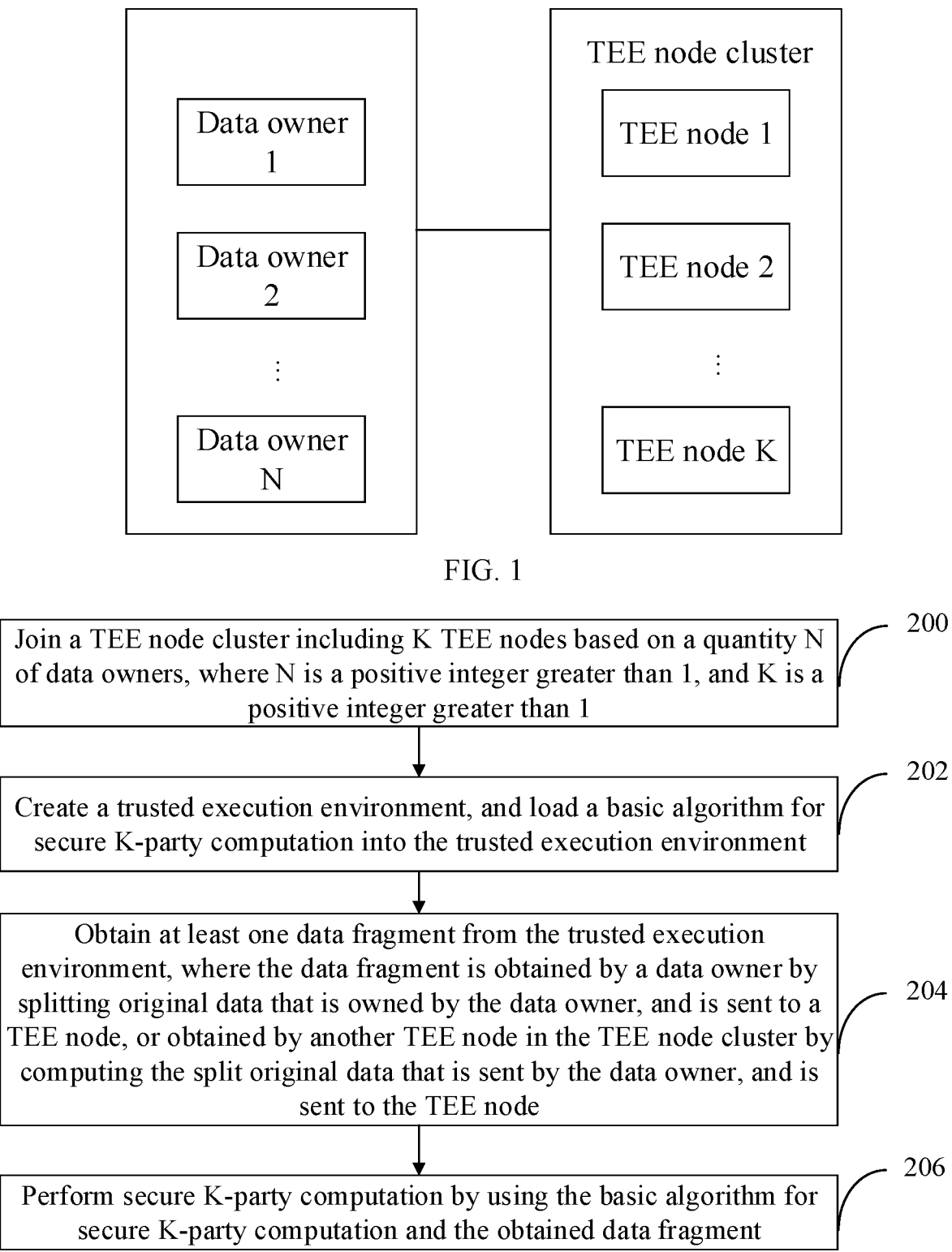

FIG. 1

Join a TEE node cluster including K TEE nodes based on a quantity N of data owners, where N is a positive integer greater than 1, and K is a positive integer greater than 1 ⟋ 200

Create a trusted execution environment, and load a basic algorithm for secure K-party computation into the trusted execution environment ⟋ 202

Obtain at least one data fragment from the trusted execution environment, where the data fragment is obtained by a data owner by splitting original data that is owned by the data owner, and is sent to a TEE node, or obtained by another TEE node in the TEE node cluster by computing the split original data that is sent by the data owner, and is sent to the TEE node ⟋ 204

Perform secure K-party computation by using the basic algorithm for secure K-party computation and the obtained data fragment ⟋ 206

FIG. 2

SECURE MULTI-PARTY COMPUTATION

CROSS-REFERENCE TO RELATED APPLICATIONS

This application is a national phase entry of International Application No. PCT/CN2022/076771 filed on Feb. 18, 2022, which claims priority to Chinese Application No. 202110317808.2 filed on Mar. 25, 2021, the contents of which are incorporated by reference herein in their entirety.

TECHNICAL FIELD

One or more embodiments of this specification relate to electronic information technologies, and in particular, to a secure multi-party computation method and apparatus.

BACKGROUND

In secure multi-party computation, data owners can provide their respective original data without leaking the original data of the data owners, perform computation based on an agreed basic algorithm, and send a computed final result to data demanders.

In a related technology, regardless of a quantity of data owners that provide original data, all the data owners serve as computation participants to perform secure multi-party computation. In such a method, computation efficiency is relatively low. Therefore, it is expected to provide a secure multi-party computation solution that can improve computation efficiency.

SUMMARY

One or more embodiments of this specification describe a secure multi-party computation method and apparatus, so as to improve computation efficiency of secure multi-party computation.

According to a first aspect, a secure multi-party computation method is provided, where the method is used to compute original data of N data owners and is applied to a trusted execution environment (TEE) node, and includes: joining a TEE node cluster including K TEE nodes based on a quantity N of data owners; creating a trusted execution environment, and loading a basic algorithm for secure K-party computation into the trusted execution environment; obtaining at least one data fragment from the trusted execution environment, where the data fragment is obtained by a data owner by splitting original data that is owned by the data owner, and is sent to the TEE node, or obtained by another TEE node in the TEE node cluster by computing the split original data that is sent by the data owner, and is sent to the TEE node; and performing secure K-party computation by using the basic algorithm for secure K-party computation and the obtained data fragment, where N is a positive integer greater than 1, and K is a positive integer greater than 1.

In some embodiments, a computation speed of the basic algorithm for secure K-party computation is higher than a computation speed of a basic algorithm for secure N-party computation.

In some embodiments, the K TEE nodes in the TEE node cluster perform the secure K-party computation through a same local area network.

In some embodiments, when the data fragment is obtained by the data owner by splitting the original data that is owned by the data owner, and is sent to the TEE node, before the obtaining at least one data fragment from the trusted execution environment, the method further includes: generating a public-private key pair in the trusted execution environment, where the public-private key pair generated by the TEE node is different from a public-private key pair generated by another TEE node in the TEE node cluster; and sending a public key in the generated public-private key pair to each data owner, and receiving symmetric key encryption information, where the symmetric key encryption information is obtained by the data owner by encrypting a generated symmetric key by using the public key sent by the TEE node, and is sent to the TEE node; and the obtaining at least one data fragment from the trusted execution environment includes: receiving, in the trusted execution environment, a data fragment sent by the data owner, obtaining the symmetric key by decrypting, by using a private key in the generated public-private key pair, the symmetric key encryption information sent by the data owner, and decrypting, by using the symmetric key obtained through decryption, the data fragment sent by the data owner, to obtain a decrypted data fragment.

In some embodiments, when N is not less than K, the K TEE nodes in the TEE node cluster are obtained by selecting K data owners from the N data owners, and loading a TEE function to the selected K data owners.

In some embodiments, K is 3.

According to a second aspect, some embodiments of this specification further provide a secure multi-party computation apparatus, where the apparatus is configured to compute original data of N data owners, and the apparatus is located in a TEE node and includes: a creation unit, configured to join a TEE node cluster including K TEE nodes based on a quantity N of data owners; and create a trusted execution environment, and load a basic algorithm for secure K-party computation into the trusted execution environment; a data fragment obtaining unit, configured to obtain at least one data fragment from the trusted execution environment, where the data fragment is obtained by a data owner by splitting original data that is owned by the data owner, and is sent to the TEE node, or obtained by another TEE node in the TEE node cluster by computing the split original data that is sent by the data owner, and is sent to the TEE node; and a computation unit, configured to perform secure K-party computation by using the basic algorithm for secure K-party computation and the obtained data fragment, where N is a positive integer greater than 1, and K is a positive integer greater than 1.

In some embodiments, a computation speed of the basic algorithm for secure K-party computation is higher than a computation speed of a basic algorithm for secure N-party computation.

In some embodiments, the K TEE nodes in the TEE node cluster perform the secure K-party computation through a same local area network.

In some embodiments, the apparatus further includes: a public-private key pair generating unit, configured to: when the data fragment is obtained by the data owner by splitting the original data that is owned by the data owner, and is sent to the TEE node, generate a public-private key pair in the trusted execution environment, where the public-private key pair generated by the TEE node is different from a public-private key pair generated by another TEE node in the TEE node cluster; and send a public key in the generated public-private key pair to each data owner, and receive symmetric key encryption information, where the symmetric key encryption information is obtained by the data owner by encrypting a generated symmetric key by using the public key sent by the TEE node, and is sent to the TEE node, where the data fragment obtaining unit is configured to receive, in the trusted execution environment, a data fragment sent by the data owner, obtain the symmetric key by decrypting, by using a private key in the generated public-private key pair, the symmetric key encryption information sent by the data owner, and decrypt, by using the symmetric key obtained through decryption, the data fragment sent by the data owner, to obtain a decrypted data fragment.

In some embodiments, when N is not less than K, the K TEE nodes in the TEE node cluster are obtained by selecting K data owners from the N data owners, and loading a TEE function to the selected K data owners.

In some embodiments, K is 3.

According to a third aspect, a computing device is provided, including a memory and a processor, where the memory stores executable code, and the processor executes the executable code to implement the method according to any embodiment of this specification.

According to the secure multi-party computation method and apparatus provided in some embodiments of this specification, a TEE node cluster including K TEE nodes is joined based on a quantity N of data owners; a TEE node in the TEE node cluster creates a trusted execution environment, and loads a basic algorithm for secure K-party computation into the trusted execution environment; the TEE node in the TEE node cluster obtains at least one data fragment from the trusted execution environment; and the TEE node cluster performs secure K-party computation by using the basic algorithm for secure K-party computation and the obtained data fragment. Because both the basic algorithm and the data fragment are in the trusted execution environment of the TEE node, it can be ensured that the TEE node is trusted, and the N data owners can rest assured that the K TEE nodes perform secure multi-party computation on the original data of the N data owners. In addition, a quantity of TEE nodes in the TEE node cluster is controllable, so that when the quantity N of data owners is fixed, a more efficient basic algorithm can be selected to perform secure multi-party computation, thereby improving computation efficiency of secure multi-party computation.

BRIEF DESCRIPTION OF DRAWINGS

To describe the technical solutions in some embodiments of this specification or in a conventional technology more clearly, the following briefly describes the accompanying drawings needed for describing some embodiments or the conventional technology. Clearly, the accompanying drawings in the following descriptions show some embodiments of this specification, and a person of ordinary skill in the art can still derive other drawings from these accompanying drawings without creative efforts.

FIG. 1 is a schematic diagram of a system architecture according to some embodiments of this specification;

FIG. 2 is a flowchart of a secure multi-party computation method according to some embodiments of this specification;

DESCRIPTION OF EMBODIMENTS

Figure 3:
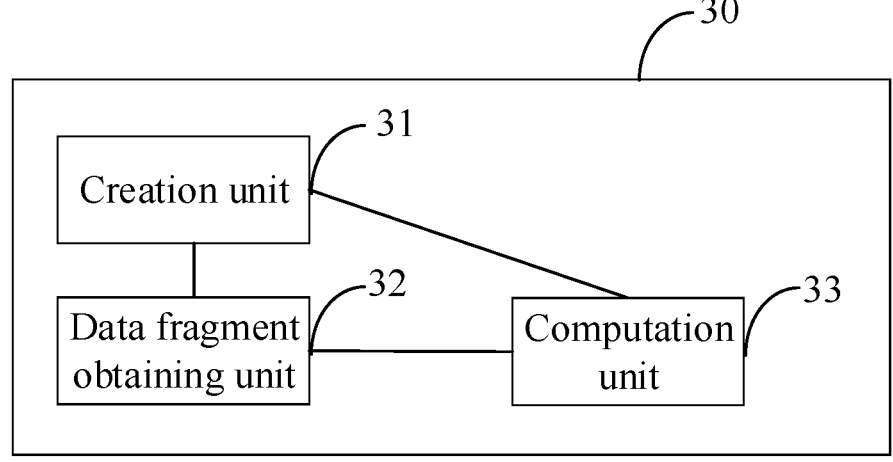
FIG. 3 is a schematic diagram of a secure multi-party computation apparatus according to some embodiments of this specification.

The solutions provided in this specification are described below with reference to the accompanying drawings.

In a related technology, when a quantity of data owners for secure multi-party computation varies, a basic algorithm for secure multi-party computation varies, and computation efficiency corresponding to performing secure multi-party computation by using different basic algorithms also varies. After a quantity N of data owners that need to perform secure multi-party computation is determined, a basic algorithm that needs to be used to perform secure N-party computation can be determined based on the quantity N of data owners, and secure N-party computation is performed on original data of the N data owners by using the basic algorithm for secure N-party computation. Because the quantity N of data owners is fixed, the corresponding basic algorithm is also definite. If the basic algorithm corresponding to the quantity N of data owners is quite complex, computation efficiency is relatively low when secure N-party computation is performed by using the basic algorithm, and consequently, efficiency of obtaining a result of secure N-party computation is certainly affected.

To improve computation efficiency of performing secure multi-party computation on the original data of the N data owners, a quantity of computation participants for performing secure multi-party computation can be changed. The changed quantity of computation participants can be determined based on the computation efficiency corresponding to the basic algorithm. For example, a basic algorithm with higher efficiency is selected, and a quantity of computation participants corresponding to the basic algorithm with higher efficiency is 3. In such case, the changed quantity of computation participants is 3, that is, secure three-party computation is performed on the original data of the N data owners by using three computation participants.

The following describes some specific implementations of the above-mentioned ideas.

To facilitate understanding of this specification, a system architecture used in this specification is first described. As shown in FIG. 1, the system architecture mainly includes N data owners and a trusted execution environment (TEE) node cluster including K TEE nodes. Both N and K are positive integers greater than 1.

The data owner is a party that provides original data. When N data owners need to provide original data for secure multi-party computation, the original data provided by the N data owners is transferred to the TEE nodes in the TEE node cluster, and the K TEE nodes perform secure K-party computation by using the original data provided by the N data owners.

The following describes a specific implementation process of the secure multi-party computation method.

FIG. 2 is a flowchart of a secure multi-party computation method according to some embodiments. It may be understood that the method can be performed by any apparatus, device, platform, or device cluster having computing and processing capabilities. Referring to FIG. 2, the method is used to compute original data of N data owners, and is applied to a TEE node. Then, a specific implementation includes: Step 200: Join a TEE node cluster including K TEE nodes based on a quantity N of data owners, where N is a positive integer greater than 1, and K is a positive integer greater than 1.

Step 202: Create a trusted execution environment, and load a basic algorithm for secure K-party computation into the trusted execution environment.

Step 204: Obtain at least one data fragment from the trusted execution environment, where the data fragment is obtained by a data owner by splitting original data that is owned by the data owner, and is sent to the TEE node, or obtained by another TEE node in the TEE node cluster by computing the split original data that is sent by the data owner, and is sent to the TEE node.

Step 206: Perform secure K-party computation by using the basic algorithm for secure K-party computation and the obtained data fragment.

In the secure multi-party computation method shown in FIG. 2, because both the basic algorithm and the data fragment are in the trusted execution environment of the TEE node, it can be ensured that the TEE node is trusted, and the N data owners can rest assured that the K TEE nodes perform secure multi-party computation on the original data of the N data owners, and a computation result obtained by the TEE cluster by performing secure K-party computation is trusted. In addition, a quantity of TEE nodes in the TEE node cluster is controllable, so that when the quantity N of data owners is fixed, a more efficient basic algorithm can be selected to perform secure multi-party computation, thereby improving computation efficiency of secure multi-party computation.

The following describes implementation processes of the steps.

In step 200, the TEE node cluster including K TEE nodes is joined based on the quantity N of data owners. N is a positive integer greater than 1, and K is a positive integer greater than 1.

If only one data owner needs to provide original data for computation, the secure multi-party computation method is not used. Therefore, when the secure multi-party computation method needs to be used for computation, a quantity N of corresponding data owners is certainly a positive integer greater than 1.

The TEE node is a server having a TEE function, and the server having a TEE function can ensure that data is confidential and tamper-resistant. However, if an attacker physically dismantles the TEE node, the attacker can still intercept the data that needs to be confidential at the sufficiently high cost. There is a case in which a single TEE node is cracked, but a probability that two TEE nodes are cracked at the same time is quite low. Therefore, a quantity K of TEE nodes that perform secure K-party computation also needs to be a positive integer greater than 1.

The data owner is a party that provides original data. The original data may be data that participates in computation, or may be a model that participates in computation. In addition, each data owner does not want its own data or model to be learned by other data owners. For example, when some data is to be predicted, original data respectively owned by five data owners is needed to obtain a prediction result. One data owner provides a prediction model, and four other data owners provide data that is used to be input into the prediction model. However, the prediction model and the data are respective privacy data of the data owners, and each data owner does not want its prediction model or data to be learned by other data owners. Therefore, result prediction can be implemented through secure multi-party computation, without leaking the original data respectively owned by the data owners.

In some embodiments of this specification, the quantity K of TEE nodes in the TEE node cluster can be determined based on the quantity N of data owners. A basis may be that a computation speed of the basic algorithm for secure K-party computation is higher than a computation speed of a basic algorithm for secure N-party computation.

For example, when N is 10, because there is frequent data exchange between computation participants in the computation process of the secure multi-party computation, a larger quantity of computation participants for secure multi-party computation indicates a larger quantity of exchange processes, which indicates heavier communication overheads and a lower computation speed. Therefore. TEE nodes whose quantity is less than N can be selected to perform secure multi-party computation. For example, K is 7, or K is 4. Reducing communication overheads increases a computation speed of secure multi-party computation.

With research on the basic algorithm for secure multi-party computation, when the quantity of computation participants for secure multi-party computation is some special quantity, a basic algorithm with a higher computation speed can be used. For example, when the quantity of computation participants for secure multi-party computation is 3, a basic algorithm for secure three-party computation has a higher speed. In such case, preferably, K is equal to 3.

In some embodiments of this specification, when the quantity K is selected as a quantity corresponding to the basic algorithm with a higher computation speed, for example, the quantity K is equal to 3, the following two relationships are included between N and K: relationship 1 in which N is not equal to K; and relationship 2 in which N is equal to K.

In relationship 1 between N and K, regardless of the quantity N of data owners, for example, N is equal to 2, or N is equal to 5, original data of the N data owners can be transferred to three TEE nodes for secure three-party computation. Because the computation speed of the basic algorithm for secure three-party computation is higher than a computation speed of a basic algorithm for secure multi-party computation with another quantity, a TEE node cluster including three TEE nodes is created to perform secure three-party computation, thereby providing a computation speed that is higher than that of secure N-party computation.

In relationship 2 between N and K, that is, N=K=3 in such case, to increase the computation speed of secure three-party computation, in some embodiments of this specification, the three TEE nodes in the TEE node cluster can be disposed in the same local area network, so as to increase the computation speed.

It may be understood that the N data owners generally belong to different organizations, and data exchange between these organizations is performed by using a public network. However, when data exchange is performed by using the public network, an exchange speed is relatively low. Generally, it may take hundreds of milliseconds to exchange data once by using the public network. During secure multi-party computation, frequent data exchange needs to be performed between a plurality of computation participants, leading to a relatively low computation speed of secure multi-party computation. In some embodiments of this specification, when data exchange is performed by using a local area network, it may take only a few milliseconds to exchange data once. In a process of frequently performing data exchange by a plurality of computation participants, a computation speed of secure multi-party computation can be increased.

Preferably, regardless of a relationship between N and K, in some embodiments of this specification, K TEE nodes in the TEE node cluster perform secure K-party computation by using the same local area network.

That the K TEE nodes perform secure K-party computation by using the same local area network can be implemented through a cloud platform. To be specific, the cloud platform provides leasing of a plurality of TEE nodes. After the quantity K of TEE nodes is determined based on the quantity N, K TEE nodes are leased from the cloud platform.

Because a plurality of TEE nodes on the cloud platform are located in the same local area network, the leased K TEE nodes are located in the same local area network, so that secure K-party computation can be performed by using the same local area network.

In some embodiments of this specification, when N is not less than K, the K TEE nodes in the TEE node cluster are obtained by selecting K data owners from the N data owners, and loading a TEE function to the selected K data owners. For example, the quantity of data owners is 5, and the quantity K of TEE nodes is 3. In such case, three data owners can be selected from the five data owners, and the TEE function is loaded to the three data owners, and then the three data owners serve as three TEE nodes in the TEE node cluster. It is necessary to ensure that the selected K data owners are trusted by the N data owners.

In step 202, a trusted execution environment is created, and a basic algorithm for secure K-party computation is loaded into the trusted execution environment.

The TEE is based on trusted hardware, and is an independent security zone on the CPU. The TEE runs in an independent environment and runs concurrently with an operating system. The CPU ensures that confidentiality and integrity of data and basic algorithms in the TEE are protected. By using both hardware and software to protect data and basic algorithms, the TEE is more secure than the operating system. A trusted application program running in the TEE can access all functions of a main processor and a memory of a device, and the hardware isolates and protects these components against impact of an application program that is installed by a user and that runs in a primary operating system. In summary, the data and basic algorithms running in the TEE are confidential and tamper-resistant.

In some embodiments of this specification, the trusted execution environment can be implemented based on an Intel SGX technology. During implementation, each TEE node can create an enclave container based on the SGX technology, and the created enclave container resides in a protected physical memory area, namely, enclave page cache (EPC). The enclave container is the created trusted execution environment.

In some embodiments of this specification, after creating a trusted execution environment, the TEE node needs to perform remote authentication on the trusted execution environment from a third-party TEE authentication server.

When the TEE node performs remote authentication, the TEE node performs measurement based on the created trusted execution environment, generates a remote authentication request based on a measurement result, and sends the remote authentication request to the TEE authentication server. The TEE authentication server verifies the trusted execution environment of the TEE node based on the remote authentication request, so as to verify whether the trusted execution environment is reasonable and credible. If the verification indicates that the trusted execution environment is reasonable and credible, it is determined that the authentication succeeds; otherwise, it is determined that the authentication fails. In such case, an authentication report is generated, and the authentication report includes an authentication result indicating whether the authentication succeeds. In addition, the TEE authentication server signs the authentication report to prevent the TEE node from tampering with the authentication report, and sends the signed authentication report to the TEE node.

Further, after receiving the signed authentication report, the TEE node sends the signed authentication report to each data owner, so that the data owner determines, based on the authentication result in the signed authentication report, whether the TEE node is trusted. The K TEE nodes separately perform authentication from the TEE authentication server to obtain K authentication reports. The data owner confirms that the TEE node cluster including the K TEE nodes is trusted, and confirms that the K TEE nodes are used to perform secure K-party computation on the original data owned by the K TEE nodes, only when the authentication results in the K authentication reports all indicate that the authentication succeeds.

In some embodiments of this specification, methods for obtaining the basic algorithm for secure K-party computation may include at least the following three methods:

Method 1: The basic algorithm is provided by an owner of the cloud platform.

Method 2: The basic algorithm is provided by the data owner.

Method 3: The basic algorithm is captured from a trusted third party.

The basic algorithm is implemented by code. After loading the basic algorithm for secure K-party computation into the trusted execution environment, the TEE node in the TEE node cluster needs to perform the computation process based on the basic algorithm when performing secure multi-party computation. In addition, after the basic algorithm is recorded in the trusted execution environment, the basic algorithm cannot be tampered with, so that it can be ensured that the TEE node performs secure multi-party computation based on the loaded basic algorithm, and the data owner trusts the TEE node and the computation result.

After determining, based on the authentication report, that the trusted execution environment of the TEE node is trusted, the N data owners further need to verify the basic algorithm that is loaded by each TEE node into the trusted execution environment. The verification method may be that each TEE node computes a hash value for the basic algorithm loaded by the TEE node, and sends the computed hash value to each data owner. The data owner determines, based on the hash value, whether the basic algorithm loaded by the TEE node is a desired basic algorithm. If the basic algorithm loaded by the TEE node is the desired basic algorithm, verification of the basic algorithm succeeds.

In step 204, at least one data fragment is obtained from the trusted execution environment, where the data fragment is obtained by a data owner by splitting original data that is owned by the data owner, and is sent to the TEE node, or obtained by another TEE node in the TEE node cluster by computing the split original data that is sent by the data owner, and is sent to the TEE node.

In some embodiments of this specification, the at least one data fragment obtained by each TEE node from the trusted execution environment can be obtained by the data owner by splitting the original data that is owned by the data owner, and is directly sent to the TEE node, or can be obtained by another TEE node in the TEE node cluster by computing the split original data that is sent by the data owner, and is sent to the TEE node.

For example, the quantity N of data owners is equal to 4, that is, there are data owners A, B. C. and D. The quantity K of TEE nodes is equal to 3, that is, there are TEE nodes E, F, and G. The data owner A splits its own original data into two data fragments, and sends the two data fragments to the TEE nodes E and F, respectively. After performing intermediate computation on the data fragments, the TEE nodes E and F send an intermediate computation result to the TEE node G.

It should be noted that the data owners can split their own original data into the same or different pieces. However, each data owner splits its own original data into at least two pieces.

In some embodiments of this specification, to improve security of a data fragment in a transmission process in which the data owner sends the data fragment to the TEE node, when the data fragment is obtained by the data owner by splitting the original data that is owned by the data owner, and is sent to the TEE node, before step 204, the method may further include: generating a public-private key pair in the trusted execution environment, where the public-private key pair generated by the TEE node is different from a public-private key pair generated by another TEE node in the TEE node cluster; and sending a public key in the generated public-private key pair to each data owner, and receiving symmetric key encryption information, where the symmetric key encryption information is obtained by the data owner by encrypting a generated symmetric key by using the public key sent by the TEE node, and is sent to the TEE node.

Correspondingly, step 204 includes: receiving, in the trusted execution environment, a data fragment sent by the data owner, obtaining the symmetric key by decrypting, by using a private key in the generated public-private key pair, the symmetric key encryption information sent by the data owner, and decrypting, by using the symmetric key obtained through decryption, the data fragment sent by the data owner, to obtain a decrypted data fragment.

In some embodiments of this specification, a persistent connection can be established between the TEE node and the data owner, so that when data transmission is performed between the TEE node and the data owner after the persistent connection is established, data transmission is performed in an encryption manner, thereby ensuring security of data in a transmission process.

This step is described by using an example in which the quantity of data owners is 4, and the quantity of TEE nodes is 3.

The data owners are respectively A, B, C, and D, and the TEE nodes are respectively E, F, and G. The TEE nodes correspond to public keys e, f, and g, respectively. The TEE node E sends the public key e to the data owners A, B, C, and D, the TEE node F sends the public key f to the data owners A, B, C, and D, and the TEE node G sends the public key g to the data owners A, B, C, and D.

The data owner A splits the original data into data fragments A1 and A2, where A1 is used to be sent to the TEE node E, and A2 is used to be sent to the TEE node F. The data owner A generates symmetric keys a1 and a2 that respectively correspond to the TEE nodes E and F, encrypts the symmetric key a1 by using the public key e corresponding to the TEE node E to obtain symmetric key encryption information a10, encrypts the symmetric key a2 by using the public key f corresponding to the TEE node F to obtain symmetric key encryption information a20, and sends the symmetric key encryption information a10 and the symmetric key encryption information a20 to the TEE nodes E and F, respectively.

The data owner A encrypts the data fragment A1 by using the symmetric key a1, encrypts the data fragment A2 by using the symmetric key a2, and sends the encrypted data fragments A1 and A2 to the TEE nodes E and F, respectively.

Correspondingly, the TEE node E receives the encrypted data fragment A1 and the symmetric key encryption information a10 that are sent by the data owner A. The TEE node E obtains the symmetric key a1 through decryption by using the private key in the public-private key pair, and obtains the data fragment A1 through decryption by using the symmetric key a1. Other encryption and decryption processes are similar to the above-mentioned encryption and decryption process, and details are not described herein again.

The symmetric key may be a generated random number.

In some embodiments of this specification, the received data fragment is ciphertext data, and can be generated by the data owner by using a technology such as secret sharing or an obfuscation circuit. The data fragment may be a cryptography fragment, or may be a random number fragment. Because the data fragment is ciphertext data, neither of the TEE nodes can learn the original data based on the data fragment sent by the data owner, thereby further ensuring privacy of the data.

In step 206, secure K-party computation is performed by using the basic algorithm for secure K-party computation and the obtained data fragment.

In some embodiments of this specification, the TEE node may be a server, or may be a server group. When the TEE node is a server group, after obtaining the data fragment, the TEE node can allocate the data fragment to other servers in the server group. The server group performs concurrent computation on the obtained data fragment, thereby improving a throughput of data processing, and increasing an overall computation speed.

Each TEE node in the TEE node cluster performs a computation process based on the basic algorithm loaded by the TEE node, and in the computation process, an intermediate computation result needs to be frequently exchanged between the TEE nodes.

To obtain a final computation result, in some embodiments of this specification, one or more TEE nodes can be designated to complete extraction of the final result. For example, when one TEE node is designated to complete extraction of the final result, another TEE node sends an intermediate computation result to the designated TEE node, and the designated TEE node extracts the final result based on the intermediate computation result of each TEE node.

In some embodiments of this specification, after obtaining a result of secure K-party computation, the TEE node in the TEE node cluster sends the result of secure K-party computation to a data demander. The data demander may be one or more of the N data owners, or may be another party other than the data owners.

Some embodiments of another aspect further provide a secure multi-party computation apparatus, where the apparatus is configured to compute original data of N data owners, and the apparatus is located in a TEE node. FIG. 3 shows a secure multi-party computation apparatus according to some embodiments. It may be understood that the apparatus can be implemented by any apparatus, device, platform, or device cluster having computing and processing capabilities. As shown in FIG. 3, the apparatus 30 includes: a creation unit 31, configured to join a TEE node cluster including K TEE nodes based on a quantity N of data owners; and create a trusted execution environment, and load a basic algorithm for secure K-party computation into the trusted execution environment; a data fragment obtaining unit 32, configured to obtain at least one data fragment from the trusted execution environment, where the data fragment is obtained by a data owner by splitting original data that is owned by the data owner, and is sent to the TEE node, or obtained by another TEE node in the TEE node cluster by computing the split original data that is sent by the data owner, and is sent to the TEE node; and a computation unit 33, configured to perform secure K-party computation by using the basic algorithm for secure K-party computation and the obtained data fragment, where N is a positive integer greater than 1, and K is a positive integer greater than 1.

In some possible implementations, a computation speed of the basic algorithm for secure K-party computation is higher than a computation speed of a basic algorithm for secure N-party computation.

In some possible implementations, the K TEE nodes in the TEE node cluster perform the secure K-party computation through a same local area network.

Figure 4:
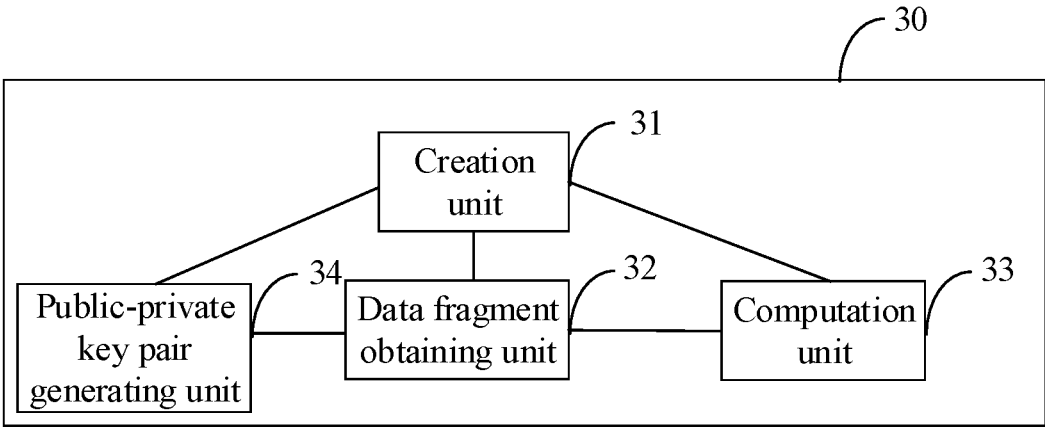
FIG. 4 is a schematic diagram of a secure multi-party computation apparatus according to some other embodiments of this specification.

In some possible implementations, referring to FIG. 4, the apparatus 30 may further include: a public-private key pair generating unit 34, configured to: when the data fragment is obtained by the data owner by splitting the original data that is owned by the data owner, and is sent to the TEE node, generate a public-private key pair in the trusted execution environment, where the public-private key pair generated by the TEE node is different from a public-private key pair generated by another TEE node in the TEE node cluster; and send a public key in the generated public-private key pair to each data owner, and receive symmetric key encryption information, where the symmetric key encryption information is obtained by the data owner by encrypting a generated symmetric key by using the public key sent by the TEE node, and is sent to the TEE node, where the data fragment obtaining unit 32 is configured to receive, in the trusted execution environment, a data fragment sent by the data owner, obtain the symmetric key by decrypting, by using a private key in the generated public-private key pair, the symmetric key encryption information sent by the data owner, and decrypt, by using the symmetric key obtained through decryption, the data fragment sent by the data owner, to obtain a decrypted data fragment.

In some possible implementations, when N is not less than K, the K TEE nodes in the TEE node cluster are obtained by selecting K data owners from the N data owners, and loading a TEE function to the selected K data owners.

In some possible implementations, K is 3.

Some embodiments of this specification provide a computing device, including a memory and a processor, where the memory stores executable code, and the processor executes the executable code to implement the method according to any embodiment of this specification.

It may be understood that the structure illustrated in some embodiments of this specification does not constitute a specific limitation on the secure multi-party computation apparatus. In some other embodiments of this specification, the secure multi-party computation apparatus may include more or fewer components than those shown in the figure, or combine some components, or split some components, or have different component arrangements. The components in the figure can be implemented by hardware, software, or a combination of software and hardware.

Content such as information exchange and an execution process between the modules in the apparatus and the system is based on the same idea as some method embodiments of this specification. Therefore, for detailed content, references can be made to descriptions in the method embodiments of this specification, and details are not described herein again.

Some embodiments of this specification are described in a progressive way. For same or similar parts of the embodiments, mutual references can be made to the embodiments. Each embodiment focuses on a difference from other embodiments. Particularly, some apparatus embodiments are briefly described because they are basically similar to some method embodiments. For related parts, references can be made to related descriptions in the method embodiments.

A person skilled in the art should be aware that in the above-mentioned one or more examples, functions described in this specification can be implemented by hardware, software, firmware, or any combination thereof. When these functions are implemented by software, they can be stored in a computer-readable medium or transmitted as one or more instructions or code on the computer-readable medium.

The above-mentioned some specific implementations further describe the purposes, technical solutions, and beneficial effects of this specification. It should be understood that the above-mentioned descriptions are merely some specific implementations of this specification and are not intended to limit the protection scope of this specification. Any modification, equivalent replacement, or improvement made based on the technical solutions of this specification shall fall within the protection scope of this specification.

What is claimed is:

1. A secure multi-party computation method, applied to a trusted execution environment (TEE) node, comprising:

joining a TEE node cluster comprising K TEE nodes based on a quantity N of data owners;

creating a trusted execution environment, and loading a basic algorithm for secure K-party computation into the trusted execution environment, wherein a computation speed of the basic algorithm for secure K-party computation is higher than a computation speed of a basic algorithm for secure N-party computation;

obtaining at least one data fragment from the trusted execution environment, wherein the data fragment comprises: the data fragment obtained by a data owner by splitting original data that is owned by the data owner, and is sent to the TEE node, or the data fragment obtained by another TEE node in the TEE node cluster by computing the split original data that is sent by the data owner, and is sent to the TEE node; and performing secure K-party computation by using the basic algorithm for secure K-party computation and the obtained data fragment, wherein N is a positive integer greater than 1, and K is a positive integer greater than 1, N≤K.

2. The method according to claim 1, wherein the K TEE nodes in the TEE node cluster perform the secure K-party computation through a same local area network.

3. The method according to claim 2, wherein when the data fragment is obtained by the data owner by splitting the original data that is owned by the data owner, and is sent to the TEE node, before the obtaining at least one data fragment from the trusted execution environment, the method further comprises:

generating a public-private key pair in the trusted execution environment, wherein the public-private key pair generated by the TEE node is different from a public-private key pair generated by another TEE node in the TEE node cluster; and sending a public key in the generated public-private key pair to each data owner, and receiving symmetric key encryption information, wherein the symmetric key encryption information is obtained by the data owner by encrypting a generated symmetric key by using the public key sent by the TEE node, and is sent to the TEE node; and the obtaining at least one data fragment from the trusted execution environment comprises:

receiving, in the trusted execution environment, a data fragment sent by the data owner, obtaining the symmetric key by decrypting, by using a private key in the generated public-private key pair, the symmetric key encryption information sent by the data owner, and decrypting, by using the symmetric key obtained through decryption, the data fragment sent by the data owner, to obtain a decrypted data fragment.

4. The method according to claim 1, wherein K is 3.

5. A computing device, comprising a memory and a processor, wherein the memory stores executable instructions that, in response to execution by the processor, cause the computing device to:

join a TEE node cluster comprising K TEE nodes based on a quantity N of data owners;

create a trusted execution environment, and loading a basic algorithm for secure K-party computation into the trusted execution environment, wherein a computation speed of the basic algorithm for secure K-party computation is higher than a computation speed of a basic algorithm for secure N-party computation;

obtain at least one data fragment from the trusted execution environment, wherein the data fragment comprises: the data fragment obtained by a data owner by splitting original data that is owned by the data owner, and is sent to the TEE node, or the data fragment obtained by another TEE node in the TEE node cluster by computing the split original data that is sent by the data owner, and is sent to the TEE node; and perform secure K-party computation by using the basic algorithm for secure K-party computation and the obtained data fragment, wherein N is a positive integer greater than 1, and K is a positive integer greater than 1, N≤K.

6. A non-transitory computer-readable storage medium having stored therein instructions that, when executed by a processor of a computing device, cause the computing device to:

join a TEE node cluster comprising K TEE nodes based on a quantity N of data owners;

create a trusted execution environment, and loading a basic algorithm for secure K-party computation into the trusted execution environment, wherein a computation speed of the basic algorithm for secure K-party computation is higher than a computation speed of a basic algorithm for secure N-party computation;

obtain at least one data fragment from the trusted execution environment, wherein the data fragment comprises: the data fragment obtained by a data owner by splitting original data that is owned by the data owner, and is sent to the TEE node, or the data fragment obtained by another TEE node in the TEE node cluster by computing the split original data that is sent by the data owner, and is sent to the TEE node; and perform secure K-party computation by using the basic algorithm for secure K-party computation and the obtained data fragment, wherein N is a positive integer greater than 1, and K is a positive integer greater than 1, N≤K.

* * * * *